(12) United States Patent
Kallesøe et al.

(10) Patent No.: US 11,060,266 B2
(45) Date of Patent: Jul. 13, 2021

(54) METHOD OF CONTROLLING A WATER RESERVOIR SUPPLY PUMP ARRANGEMENT AND WATER RESERVOIR SUPPLY PUMP ARRANGEMENT

(71) Applicant: GRUNDFOS HOLDING A/S, Bjerringbro (DK)

(72) Inventors: Carsten Kallesøe, Viborg (DK); Abdul-Sattar Hassan, Egå (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 102 days.

(21) Appl. No.: 15/820,964

(22) Filed: Nov. 22, 2017

(65) Prior Publication Data
US 2018/0148909 A1 May 31, 2018

(30) Foreign Application Priority Data

Nov. 25, 2016 (EP) .................................. 16200618

(51) Int. Cl.
| | |
|---|---|
| *E03B 5/00* | (2006.01) |
| *F04D 15/00* | (2006.01) |
| *E03B 7/02* | (2006.01) |
| *E03B 7/07* | (2006.01) |
| *E03B 11/10* | (2006.01) |

(Continued)

(52) U.S. Cl.
CPC .................. *E03B 5/00* (2013.01); *E03B 7/02* (2013.01); *E03B 7/075* (2013.01); *E03B 11/10* (2013.01); *E03B 11/12* (2013.01); *F04D 15/0066* (2013.01); *G05B 15/02* (2013.01); *G05D 7/0676* (2013.01); *G06F 17/12* (2013.01)

(58) Field of Classification Search
CPC ....... E03B 7/075; E03B 11/12; G05D 7/0676; G05D 9/12; Y10T 137/7287
See application file for complete search history.

(56) References Cited

U.S. PATENT DOCUMENTS 4,180,083 A * 12/1979 Miyaoka ............... H02J 15/003
  137/101.25
4,265,263 A   5/1981 Hobbs
(Continued)

FOREIGN PATENT DOCUMENTS

| CN | 102543235 A | 7/2012 |
| CN | 106707753 A | 5/2017 |

(Continued)

*Primary Examiner* — Mohammad Ali
*Assistant Examiner* — Vincent W Chang
(74) *Attorney, Agent, or Firm* — McGlew and Tuttle, P.C.

(57) ABSTRACT

A method of controlling a water reservoir supply pump arrangement determines a set value p, q, v, n of the pump arrangement based on an offset value $p_{ref}$, $q_{ref}$, $n_{ref}$, $v_{ref}$, $G_0$ reduced by a component which is a function of a difference between an actual water level h and a predetermined water level $h_{ref}$ in a water reservoir. The difference is weighted by a proportional gain factor G. Further, a water reservoir supply pump arrangement is provided including at least one water pump and a control device for controlling the at least one pump.

22 Claims, 10 Drawing Sheets

(51) Int. Cl.
*E03B 11/12* (2006.01)
*G05B 15/02* (2006.01)
*G05D 7/06* (2006.01)
G06F 17/12 (2006.01)

(56) References Cited

U.S. PATENT DOCUMENTS

| | | | | |
|---|---|---|---|---|
| 5,197,859 A | * | 3/1993 | Siff | F04B 49/022 417/19 |
| 6,325,093 B1 | * | 12/2001 | Ooshima | G05D 7/0682 137/392 |
| 2002/0119249 A1 | * | 8/2002 | Kevin | G05D 9/12 427/249.19 |
| 2007/0114162 A1 | * | 5/2007 | Stiles | F04D 15/0066 210/137 |
| 2009/0159018 A1 | * | 6/2009 | Mehendale | F01K 23/101 122/451 R |
| 2010/0126433 A1 | * | 5/2010 | Kozaki | F22D 5/30 122/451 R |
| 2012/0111431 A1 | * | 5/2012 | Singh | E03B 11/02 137/565.01 |
| 2012/0170702 A1 | | 7/2012 | Song et al. | |
| 2014/0271235 A1 | | 9/2014 | Magyar | |

FOREIGN PATENT DOCUMENTS

| | | |
|---|---|---|
| DE | 42 22 867 A1 | 1/1994 |
| GB | 2 294 748 A | 5/1996 |
| SU | 1551827 A1 | 3/1990 |

\* cited by examiner

METHOD OF CONTROLLING A WATER RESERVOIR SUPPLY PUMP ARRANGEMENT AND WATER RESERVOIR SUPPLY PUMP ARRANGEMENT

CROSS REFERENCE TO RELATED APPLICATIONS

This application claims the benefit of priority under 35 U.S.C. § 119 of European Application 16 200 618.3, filed Nov. 25, 2016, the entire contents of which are incorporated herein by reference.

FIELD OF THE INVENTION

The invention relates to a method of controlling a water reservoir supply pump arrangement, a method of controlling a plurality of water reservoir supply pump arrangements, and a water reservoir supply pump arrangement.

BACKGROUND OF THE INVENTION

Typically, municipal water supply systems utilize elevated reservoirs to set the pressure in the system and to keep backup water in case of an emergency available. In prior art, various setups of water supply systems comprising water tanks are known. For example, a rather typical example of such a setup widely employed in North and South America, comprises a tank which sets the pressure in the network, and serving as a disconnection reservoir between the system flow and the pump flow as shown in FIG. 1. This enables an on/off control of the pumps in the system. However, besides enabling an on/off control, the tank according to this configuration known from prior art serves as an emergency reservoir, as mentioned above. Moreover, the tank is able to act as a reactor for, for example, chorine injection, since all of the water comprised in the system passes through this tank.

Another configuration known from prior art which is usually employed in Europe comprises a tank which has the same functions as described above, except for the function of acting as a reactor. There it is common that several consumers are connected to distribution water grid between the water tank and the booster pump as shown in FIG. 2. A further disadvantage of these configurations mostly used in Europe is that it is difficult to ensure the age of the water being below a predefined value.

In many cities, however, it is mandatory to have water reservoirs inside the buildings for purposes of firefighting. These water reservoirs are referred to as roof top tanks. The structure of a roof top tank system is similar to the system which is used in North and South America as described above, except for the tank being placed on top of the building.

In all of the system configurations mentioned above, the pumps are typically controlled by an on/off controller that stops and starts the pumps in accordance with the water level in the tank.

Moreover, it is known from prior art to run the pumps proportionally to the water level in the tank. In many large water supply systems, the pumps are started at different tank water levels, approximating a proportional pressure control.

The systems described employ proportional control, as the pressure in the system is only changing rather slowly, thus, eliminating pressure shocks, and thereby also decreasing wear of the piping, valves, and pumps. Moreover, the proportional pressure control stabilizes the pressure in city areas, for example, when used with the systems described above for the European sector. This has the advantage that due to the stable system pressure, pipe bursts are prevented or at least reduced. In addition to the advantages with respect to the system pressure, changing from an on/off control to proportional control saves energy and thus, costs.

However, proportional control is not widely used since it causes problems with adjusting the proportional factor so as to achieve the desired effect.

For example, it is known in prior art to start pumps at different levels such that, for example, below a level 1, one pump is running, below a level 2, two pumps are running, and so on.

Further, from wastewater applications it is known to control the pump speed proportional to the water level.

However, all approaches known from prior art are not able to automatically adjust the proportional factor so as to ensure a continuous flow.

Another approach to this problem uses some kind of Model Predictive Control (MPC) which, however, is rather complicated and requires a sophisticated model of the system, thereby, involving high costs.

SUMMARY OF THE INVENTION

Therefore, the present invention is based on an object to provide a method for controlling one or more water reservoir supply pump arrangement without compromising safety of the system.

This problem is solved by a method for controlling a water reservoir supply pump arrangement, a method for controlling a plurality of water reservoir supply arrangements, as well as a water reservoir supply arrangement.

According to the present invention, a method of controlling a water reservoir supply pump arrangement is provided, wherein a set value p, q, v, n of the pump arrangement is determined based on an offset value $p_{ref}$, $q_{ref}$, $n_{ref}$, $v_{ref}$, $G_0$ reduced by a component which is a function of the difference between the actual water level h and a predetermined water level $h_{ref}$ in the water reservoir, the difference being weighted automatically adjusted by a proportional gain factor G. According to the present invention, in addition to the on/off control, in the on-period, the pressure is allowed to vary with the level in the reservoir. This makes the system robust against sudden changes. Also, robustness against control parameters design is ensured, since the tank level is controlled by means of a proportional controller with a fixed offset term. That is, stability is always ensured according to the inventive configuration. Namely, compared to a PI control, this is very important as the rather slow dynamics of the reservoir or tank makes it difficult to adjust the parameters of the PI controller properly. The use of a proportional controller ensures that the level in the reservoir varies during the day, and thereby ensures some change of water in the reservoir so as to maintain the water quality in the reservoir.

Moreover, using a proportional control causes the pressure in the system to change only slowly, thereby, eliminating pressure shocks and decreasing wear of the piping, valves, and pumps.

Another advantage of the inventive method is that the proportional pressure control stabilizes the pressure, for example, in city areas thereby avoiding pipe bursts. Finally, there are also advantages with respect to energy consumption.

According to a preferred embodiment of the invention, the set value and the offset value are one of pump reference pressure, reference pump flow, reference pump speed, reference number of switched-on pumps in the supply pump arrangement.

Moreover, preferably the predetermined water level is a minimum water level.

According to the invention, the gain factor is adjusted each time a predetermined water level, in particular, a maximum water level, in the reservoir is reached and/or a predetermined time interval T has elapsed. Alternatively, the predetermined water level may be a minimum water level.

Also, the gain factor and/or the offset value $G_1$ may be adjusted such that the maximum water level measured over time is a fraction of the difference between a maximum and a minimum permissible water level.

Further, it is preferable, if the gain factor is adjusted each time after a predetermined time interval T has elapsed such that $$G_{k+1}=G_k-K(h_{high}*-h_{high})$$

where $$h_{high}*=\alpha h_{max}+(1-\alpha)h_{min}$$

and where k denotes the $k_{th}$ time interval T, $\alpha$ denotes the fraction, $h_{max}$ denotes a maximum permissible level threshold, $h_{min}$ denotes a minimum permissible level threshold, $h_{high}$ is the maximum measured level over a given period of time, and K being a predetermined constant>0.

Further, it is advantageous, if the pump arrangement is switched on when the actual water level is below a predetermined minimum level, and is switched off when the actual water level has reached a predetermined maximum water level.

The set value preferably is the flow, and a maximum set flow preferably is decreased by a predetermined flow value if the pressure is higher than a predetermined maximum pressure value, and a minimum set flow preferably is increased by a predetermined flow value if the pressure is lower than a predetermined minimum pressure value.

According to still a further preferred embodiment of the invention, the set value is pressure, and a maximum set pressure is decreased by a predetermined pressure value if the flow is higher than a predetermined maximum flow value, and a minimum set pressure is increased by a predetermined pressure value if the flow is lower than a predetermined minimum flow value.

Moreover, the gain and the highest offset value may be adjusted such that variations of the water level over time utilize a predefined water level band, where the water level band lies between a maximum and a minimum allowed permissible water level.

The set value may be one of pressure and flow, and the offset value may be gain, and wherein the proportional gain factor and the offset value may be adjusted each time a predetermined interval T has elapsed, the proportional gain factor and the offset value preferably being adjusted as $$G_{1,k+1}=G_{1,k}-K_1((h_{high}*-h_{high})-(h_{low}*-h_{low}))$$

$$G_{0,k+1}=G_{0,k}+K_0((h_{high}*-h_{high})+(h_{low}*-h_{low}))$$

with $G_{1,\ k+1}$ being the set value adjusted after the $(k+1)^{th}$ time interval,
$G_{1,\ k}$ being the set value adjusted after the $k^{th}$ time interval,
$G_{0,\ k+1}$ being the offset value adjusted after the $(k+1)^{th}$ time interval,
$G_{0,\ k}$ being the offset value adjusted after the $k^{th}$ time interval,
and
$h_{high}$ being the maximum level of the $k^{th}$ time interval,
$h_{low}$ being the minimum level of the $k^{th}$ time interval, and $$h_{high}*=\alpha h_{max}+(1-\alpha)h_{min}$$

$$h_{low}*=(1-\beta)h_{max}+\beta h_{min}$$

where k denotes the $k^{th}$ time period T and $\alpha$ denotes the fraction, $\beta$ denotes another fraction, $h_{max}$ denotes a maximum permissible level threshold, $h_{min}$ denotes a minimum permissible level threshold, $h_{high}$ is the maximum level and $h_{low}$ is the minimum level, both levels measured over a given period of time, and $K_0$ and $K_1$ being predetermined constants>0.

It is also preferable, if the set value is one of pressure and flow, and the offset value is gain, and wherein the proportional gain factor and the offset value are adjusted each time a predetermined interval T has elapsed, the proportional gain factor and the offset value being adjusted as $$G_{1,k+1}=G_{1,k}-K_1((h_{high}*-h_{high})-(h_{low}*-h_{low}))$$

$$G_{0,k+1}=G_{0,k}+K_0G_{1,k+1}((h_{high}*-h_{high})+(h_{low}*-h_{low}))$$

Preferably, the set value is one of pressure and flow, and the offset value is gain, and wherein the offset value is updated each time a predetermined interval T has elapsed and if the water level drops below a minimum permissible level $h_{min}$, the offset value being adjusted as $$G_{0,t+1} = \begin{cases} G_{0,t}, & h \geq h_{min} \\ G_{0,t} + K_2(h_{min}-h), & h < h_{min} \end{cases}$$

with
$G_{0,\ t+1}$ being the offset value adjusted after the $(t+1)^{th}$ time interval,
$G_{0,\ t}$ being the offset value adjusted after the $t^{th}$ time interval, and
where t denotes the $t^{th}$ time period T and $K_2$ being predetermined constants>0.

According to yet another preferred embodiments, all pump arrangements supply the same water reservoir, wherein the set value is flow, and wherein each set value is determined according to the method described before and the respective set values being scaled according to the following formula:

$$q_{set,i}=s_iG_0-s_iG_1(h-h_{min})$$

with $s_i$ denoting a scaling coefficient adjusting the amount of water delivered by the $i^{th}$ pump arrangement, and i denoting the respective pump arrangement.

The proportional gain factor and the offset value may be the same for all pump arrangements, and may be given by:

$$G_{0,k+1}^{(j)} = G_{0,k}^{(j)} + \frac{\kappa}{|U|}\sum_{i \in U}\left(G_{0,k}^{(i)} - G_{0,k}^{(j)}\right)$$

$$G_{1,k+1}^{(j)} = G_{1,k}^{(j)} + \frac{\kappa}{|U|}\sum_{i \in U}\left(G_{1,k}^{(i)} - G_{1,k}^{(j)}\right)$$

with U being the number of switched on pumps, and $\kappa$ being a predetermined gain convergence control factor.

Further, one of the pump arrangements may also comprise a plurality of slave pump arrangements and the respective sub-pump flows may be calculated according to $$q_{set,i}=s_iq_{set,1}$$

with $q_{set,\ i}$ being the flow reference for the $i^{th}$ slave pump controller, $q_{set,\ 1}$ being the flow of the master pump controller, and $s_i$ being a number that defines the distribution of the flow between the pumping arrangements, in particular, between pumping stations.

According to the present invention, a water reservoir supply pump arrangement comprising at least one water pump and a control device for controlling the at least one pump according to the method described above is provided. The water reservoir supply arrangement according to the present invention offers a robust system with the various advantages described above.

The invention is not limited to the described embodiments which can be modified in many ways. Preferred embodiments of the present invention will now be more particularly described, by way of example, with reference to the accompanying drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
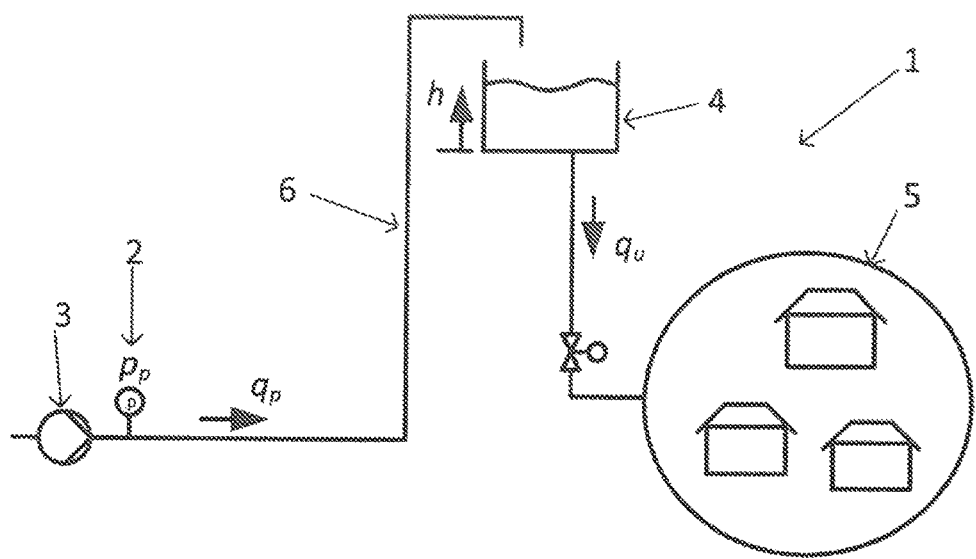
FIG. 1 is a schematic view for a setup of a water supply system according to prior art.

FIG. 1 shows a schematic view for a setup for a water supply system 1 according to prior art as it is typically used in America and Asia. The water supply system 1 comprises a water reservoir supply pump arrangement 2 with a pump 3 and a tank or reservoir 4 for supplying water to a plurality of houses 5. The reservoir 3, here, controls the pressure in the network connected by pipes 6 and serves as a disconnection reservoir between the end user flow $q_u$ and the pump flow $q_p$. This enables an on/off control of the pump 3 or a plurality of pumps, whereby the water level h in water reservoir 4 is controlled by on/off controllers which start the pumps 3 when a low-level threshold is reached and stops the pumps when a high-level threshold is reached. Besides enabling on/of control, the reservoir 4 serves as an emergency reservoir. Moreover, the reservoir 4 may also function as a reactor for, for example, chlorine injection, since all the water in the water supply system 1 passes through the reservoir 4.

Figure 2:
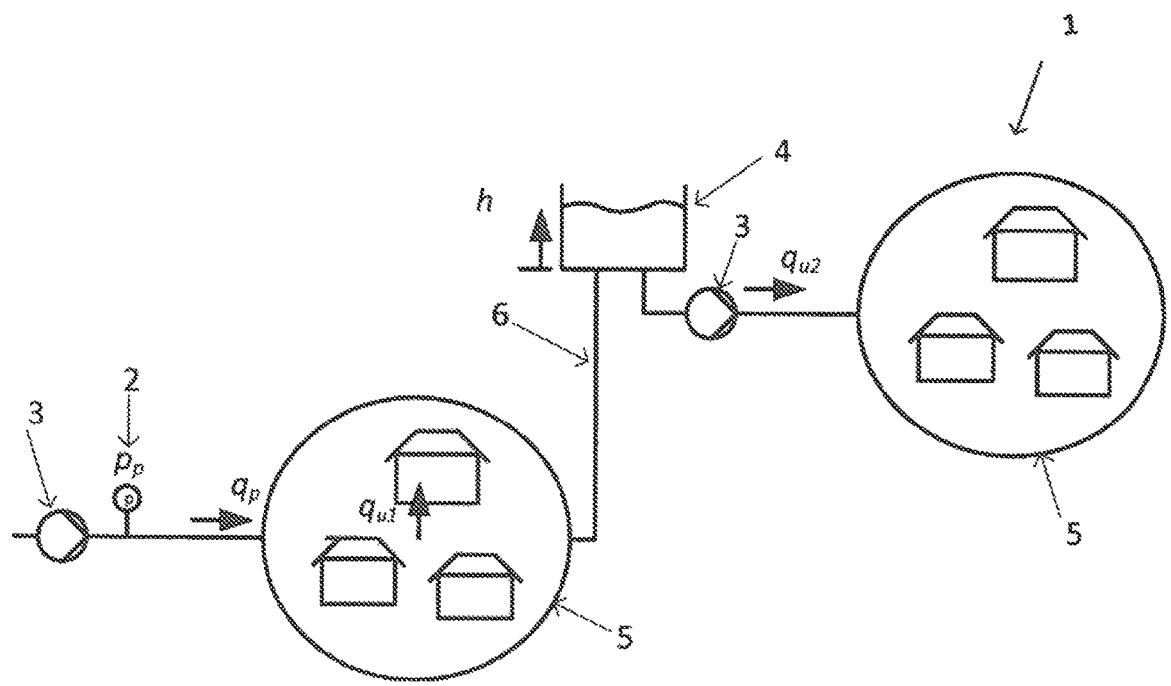
FIG. 2 is a further schematic view for a setup of a water supply system according to prior art.

FIG. 2 shows a further schematic arrangement of a water supply system 1 according to prior art which commonly is used in Europe. The configuration shown basically corresponds to the one illustrated in FIG. 1. However, here the reservoir 4 is not able to function as reactor. A further disadvantage with this configuration is that it is difficult to ensure the age of the water is below a predefined value.

Figure 3:
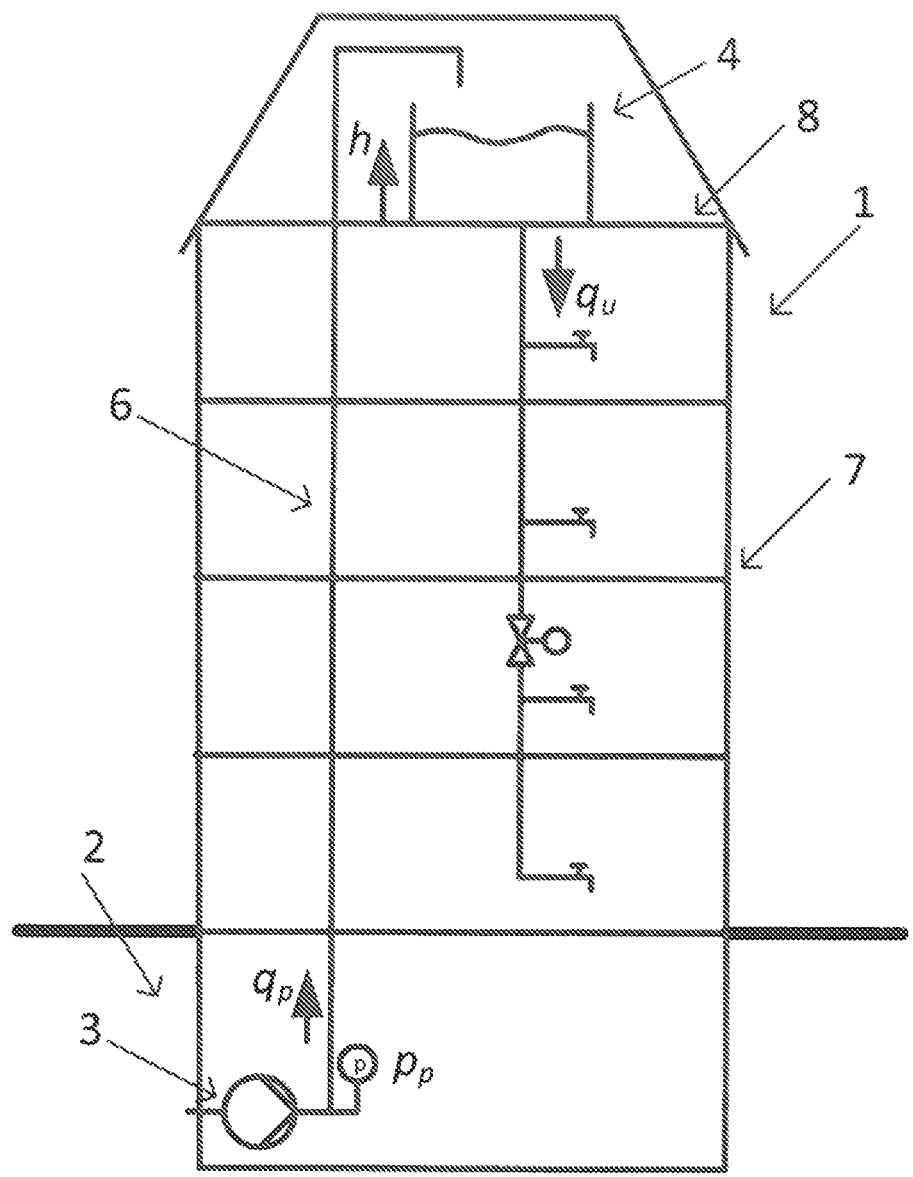
FIG. 3 is a schematic view for a setup of a water supply system for buildings with roof top tanks.

FIG. 3 shows a schematic arrangement of a water supply system 1 for a building 7 with a roof top tank or reservoir 4 which are employed in cities in which it is mandatory to have water reservoirs inside the building 7 for firefighting. The water supply system 1 shown here also is similar to the one shown in FIG. 1, except that the tank or reservoir 4 is placed on the top 8 of the building 7.

In all water supply systems 1 described above, a controller controls the pump 3 or a plurality of pumps so as to stop and start the pump 3 or pumps in accordance with a water level h in the tank or reservoir 4. It is noted that in many large water supply systems 1, the pumps 3 are started at different water levels h which procedure approximates a proportional pressure control. However, according to prior art applications, it is not possible to adjust the proportional factor automatically so as to ensure a continuous flow.

Figure 4:
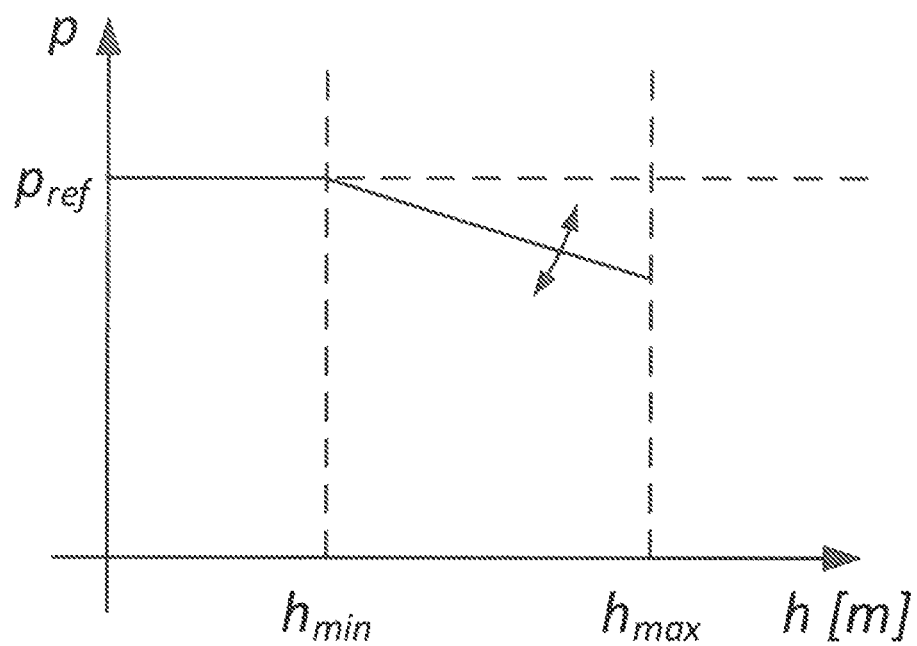
FIG. 4 is a proportional pressure curve for a water reservoir supply pump arrangement according to an embodiment of the present invention.

FIG. 4 shows a proportional pressure curve for a water reservoir supply pump arrangement 2 according to an embodiment of the present invention. Here, a pressure set-point $p_{set}$ for a controller of a pump station or water reservoir supply pump arrangement 2 is a function of the water level h in the reservoir 4. In the diagram of FIG. 4, $p_{ref}$ indicates the maximum pressure set point for the pumping station controller, and the tank or reservoir water level h is controlled between a minimum water level setting $h_{min}$ of the reservoir 4 and a maximum water level setting $h_{max}$ of the reservoir 4 by using a proportional controller with a fixed offset term so that the water level h stays below $p_{ref}$. The reason for this is that it ensures robustness against the control parameters design. That is, in addition to the other advantages already listed above, stability is always ensured in the water supply system 1.

In the on-periods, the pump station water reservoir supply pump arrangement 2 controls the pressure in accordance with the level h following the relation equation (1)

$$p_{set} = p_{ref} - G(h - h_{min}) \qquad \text{equation (1)}$$

with $p_{set}$ being the actual pressure provided by the pump station water reservoir supply pump arrangement 2, $p_{ref}$ being the pressure reference of the pump station water reservoir supply pump arrangement 2 when running as an on/off controller, and G being the proportional factor. Further, h is the actual level in the tank or reservoir 4, and $h_{min}$ is the minimum permissible level threshold set by the user. The effect of this control is illustrated in FIG. 4. According to this approach, the pressure is used as a reference value or pump station reference. Instead, the flow could be used just as well, in which case the proportional control would be represented by equation (2):

$$q_{set} = q_{max} - G(h - h_{min}) \qquad \text{equation (2)}$$

In the case of a water reservoir supply pump arrangement 2, which is controlled by a speed reference, the proportional control would be represented by equation (3):

$$n_{set} = n_{ref} - G(h - h_{min}) \qquad \text{equation (3)}$$

Finally, in the case where the water reservoir supply pump arrangement 2 comprises fixed speed pumps 3, the number of running pumps 3 can be controlled proportional to the level h. Let v denote the number of active pumps 3, then the proportional control would be represented by equation (4):

$$v_{set} = \text{ceil}(v_{max} - G(h - h_{min})) \qquad \text{equation (4)}$$

where "ceil" is denoting that the smallest integer number bigger that the content of the bracket.

Figure 5:
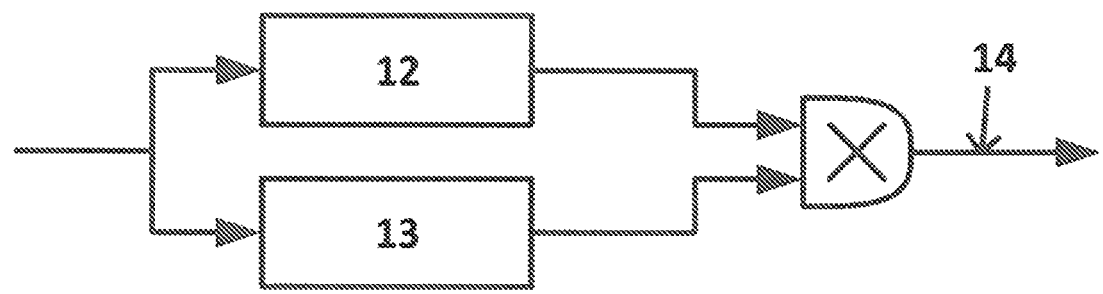
FIG. 5 is a schematic illustration for the division between on/off control mode and continuous level control mode for controlling a pump according to an embodiment of the present invention.

On the basis of FIG. 5 showing a schematic illustration for the division between on/off control mode 12 and continuous level control mode 13 for controlling a pump 3 according to an embodiment of the present invention, the adaptive adjustment of the gain factor G is explained. The adjustment of the gain factor G in the previous described level control strategy is in this approach adaptive. The adjustment strategy is divided into two levels following the division of the level control strategy.

The main control strategy is on/off control 12. This control ensures that the level h never exceeds the maximum level setting and never decrease below the minimum level setting. This is done by switching the complete pump station or water reservoir supply pump arrangement 2 on and off based on the level settings. When the pump station or water reservoir supply pump arrangement 2 is switched on, the continuous level control 13 adjusts the pump pressure and flow depending on the choice of control. This is done according to the control described in equations (1) to (4). The gain is adjusted both in the on/off control and in the continuous control and a reference output 14 is obtained. In the following, first the adjustment in the on/off control mode 12 is described followed by the adjustment in the continuous control mode 13.

Figure 6:
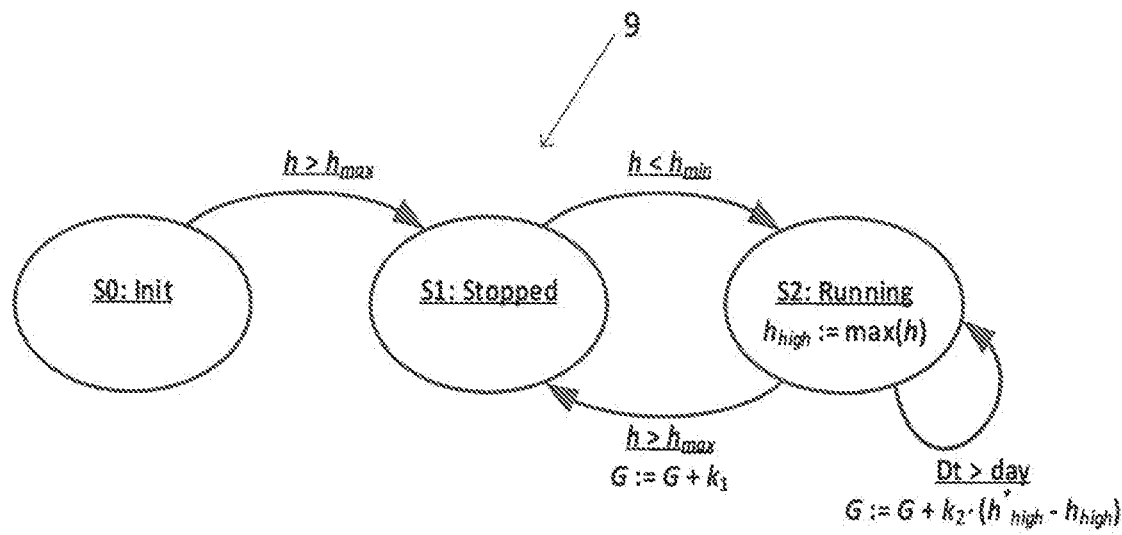
FIG. 6 is a schematic view for a setup which is controlled according to an embodiment of the method according to the present invention.

FIG. 6 shows a schematic view for a setup which is controlled according to an embodiment of the method according to the present invention, wherein a state machine 9 controls the level h and adjusts the gain factor G so as to ensure continuous operation of the pump station or water reservoir supply pump arrangement 2.

As described above, the problem with the use of a proportional tank filling control is to choose a good value for the gain factor G. Here, this problem is solved by adjusting the gain each time the maximum level is reached as this is an indication that the pressure is too high to obtain continuous pump operation. The state machine 9 illustrated in FIG. 6 acts on the level, starts and stops the pump 3 of the pump station or water reservoir supply pump arrangement 2. The state machine adjusts the gain factor G after each pump 3 is switched off, and at predefined time instants to obtain continuous pump operation.

Figure 7:
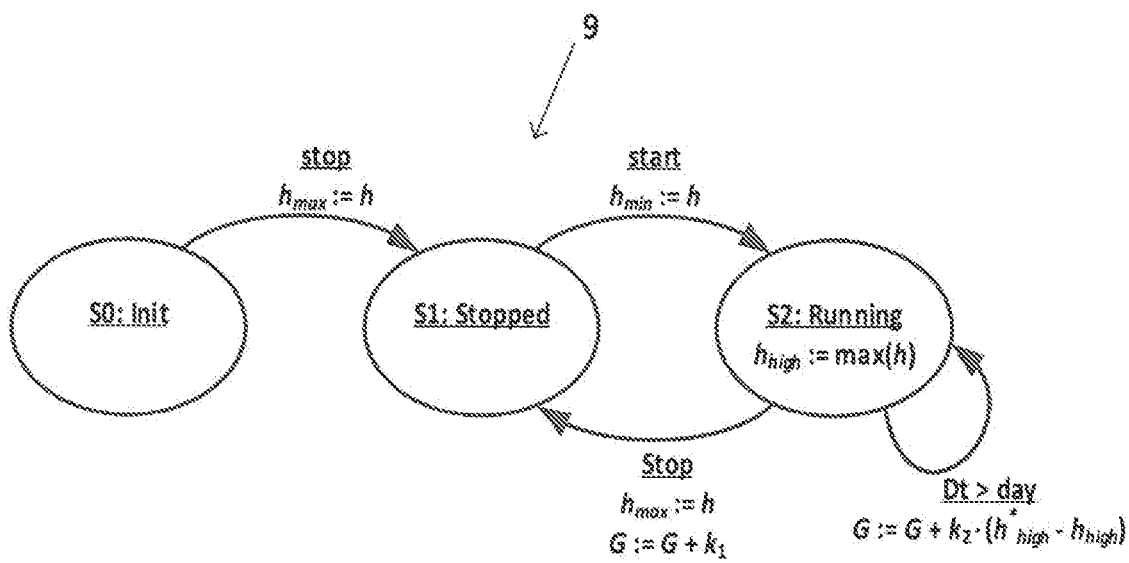
FIG. 7 is a further schematic view for a setup which is controlled to a further embodiment of the method according to the present invention.

FIG. 7 shows a further schematic view for a setup which is controlled to a further embodiment of the method according to the present invention. Here, the state machine 9 identifies the minimum and maximum control level and adjusts the gain factor G according to the on/off level control signal. This applies for cases in which the water supply system 1 is equipped with a level controller that sends an on/off signal to the pump controller. In these cases, this on/off signal can be used for identifying the minimum and maximum level and to adjust the gain factor G, as is done by the state machine 9 shown here.

Figure 8:
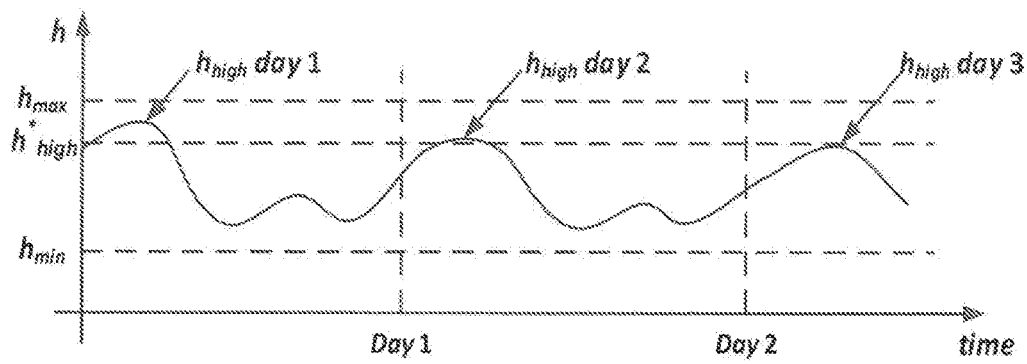
FIG. 8 is a diagram showing a level series for identifying a maximum level on a daily basis.

FIG. 8 is a diagram for explaining the adjustment in the continuous control and showing a level series for identifying a maximum level on a daily basis. Here, the value of the maximum level decreases by increasing the gain factor G until the maximum level is below the value $h^*_{high}$.

When the pump 3 is running continuously the gain G is adjusted such that the maximum valve of h is around 80% of the difference between the maximum and minimum level threshold ($h_{max}$ and $h_{min}$). This is done by first identifying the highest level obtained over a given period according to equation (5):

$$h_{high} = \max_{t \in T} h(t) \qquad \text{equation (5)}$$

where h(t) is the level at time t and the term max searches for the maximum level over the time period τ, where τ preferably covers 1 day. The outcome of this search is the maximum level obtained during one day, here denoted as $h_{high}$ in this figure.

When the maximum level over the period τ is known then G is adjusted according to the following equation (6) once in each time period τ:

$$G_{k+1} = G_k - K(h_{high}^* - h_{high}) \qquad \text{equation (6)}$$

where $$h_{high}^* = \alpha h_{max} + (1-\alpha) h_{min}$$

where k denotes the $k^{th}$ time period τ, and 0<α<1 denotes the fraction between the maximum level $h_{max}$ and the minimum level $h_{min}$ that the level should reach in the period τ. The term $\alpha h_{max} + (1-\alpha) h_{min}$ here equals to $h^*_{high}$. Finally, κ is a gain constant that controls the adjustment rate. κ is the adaptation constant and should have a value larger than zero.

Figure 9:
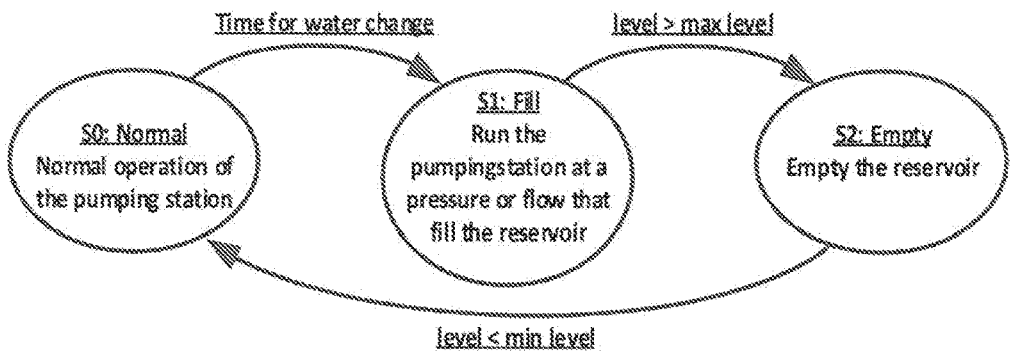
FIG. 9 is a schematic view for a setup which is controlled according to still a further embodiment of the method according to the present invention.

FIG. 9 shows a schematic view for a setup which is controlled according to still a further embodiment of the method according to the present invention. Here, a procedure or strategy for pump station control with forced water change in the tank or reservoir 4 and the water quality features are explained.

The age of the water in the reservoir 4 is a very important parameter for the quality of the water. To ensure the water quality, the average stay time of the water in the reservoir 4 must be limited, and the reservoir 4 has to be clean. With the control approach described in connection with this FIG. 9, the natural stay time of the water will increase in applications with a structure similar to the water supply system 1 shown in FIG. 2. Here, the water quality problem with the following two features.

In order to ensure water quality, an emptying procedure is initiated at predefined times, typically once a day or once a week. The state event machine 9 shown in this figure controls the emptying procedure. At the empty state, the pumping station or water reservoir supply pump arrangement 2 controls the pressure or flow according to a predefined pressure or flow set point that is low enough to empty the reservoir 4. Alternatively, the pumps 3 of the pump station or water reservoir supply pump arrangement 2 stop.

Figure 10:
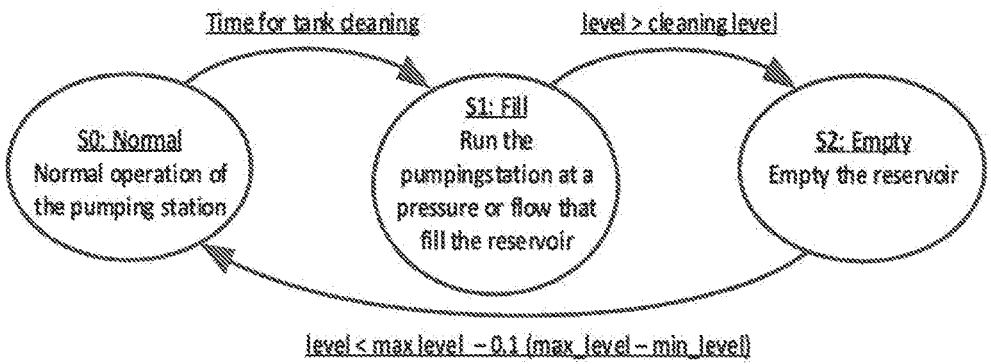
FIG. 10 is a schematic view for a setup which is controlled according to another embodiment of the method according to the present invention.

FIG. 10 shows a schematic view for a further setup which is controlled according to another embodiment of the method according to the present invention. Here, a strategy for pump station control for cleaning the tank or reservoir 4 will be explained, wherein "cleaning" means that the reservoir 4 is filled to its maximum ensuring that the whole reservoir 4 is flushed. The state event machine 9 illustrated here carries out such a cleaning procedure. The cleaning Level in the figure is the level that defines the top of the tank or reservoir 4 just before water flows over. Commonly, the cleaning procedure is run as the reservoir is already filled to its maximum, thereby ensuring the best possible change of the water.

Figure 11:
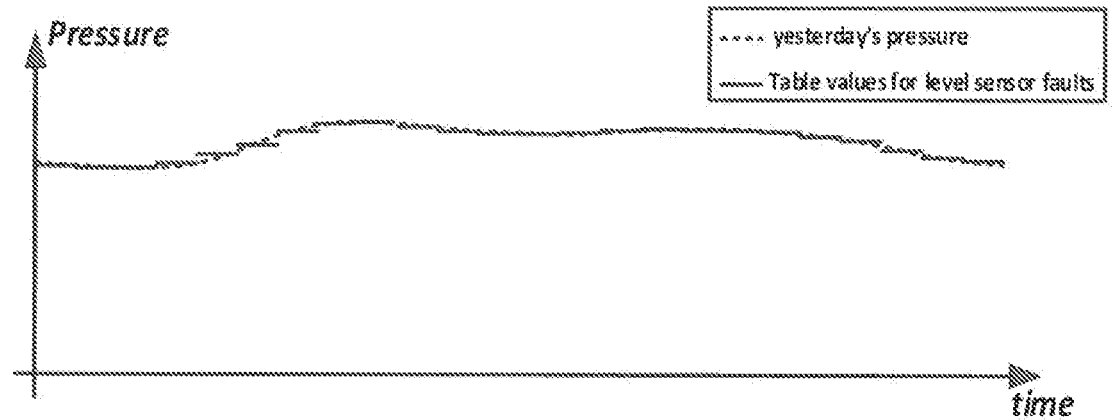
FIG. 11 is a diagram showing a pressure profile and a logged pressure profile for the use in case of a level sensor fault.

FIG. 11 is a diagram showing a pressure profile and a logged pressure profile for the use in case of a level sensor fault on the basis of which several safety strategies are described. For a level sensor fault, the following applies.

The level sensor (not shown) is transmitted from the reservoir 4 to the pump station or water reservoir supply pump arrangement 2 which typically are separated by several kilometres so that a sophisticated strategy for controlling the pump station or water reservoir supply pump arrangement 2 in the case of a level sensor fault is very important. When a level sensor fault appears, the pump station or water reservoir supply pump arrangement 2 operates with the pressure values that have been provided to the system at the same time of the day the day before. This is done by setting up a profile of pressure values from the day before, or an average of the pressure from a number of days in the past. This is exemplified in this where the average pressure for each hour is logged, and used for the next day control in the case of a level sensor fault.

Figure 12:
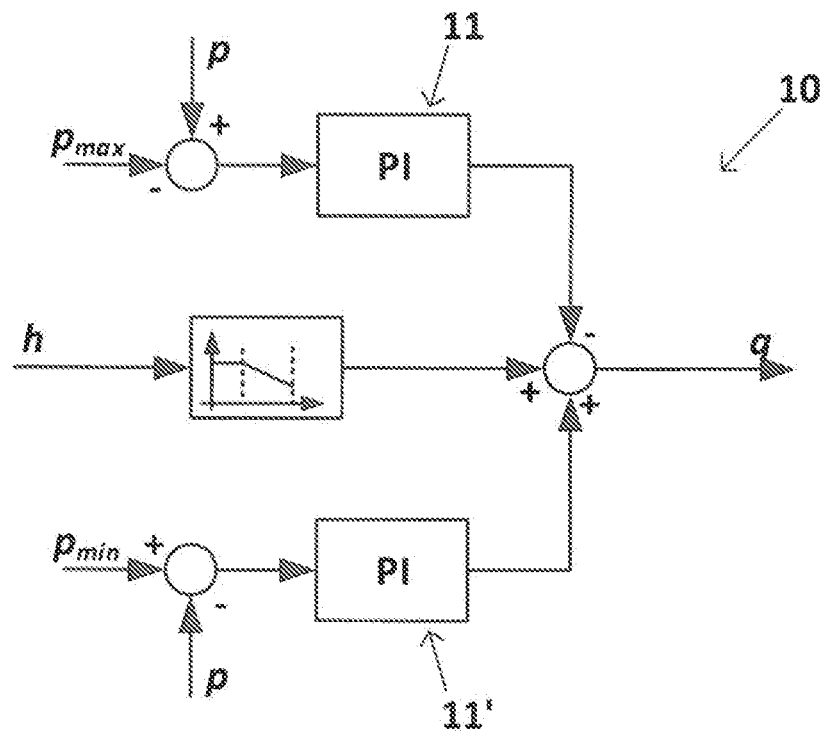
FIG. 12 is a diagram view of a control structure for controlling the limits for the flow according to an embodiment of the present invention.

FIG. 12 shows a control structure 10 for controlling the limits for the flow according to an embodiment of the present invention. The control structure 10 comprise two controllers 11 and 11' which here are embodied as PI controllers and which control the limits for the flow in order to ensure that the pressure is kept in accordance to the constraints $p_{max}$ and $p_{min}$, with $p_{max} > p_{min}$.

In the case where the flow q is chosen as the control variable (control as represented in equation (2) there is a risk of the pressure becoming too high or too low for the water supply system 1, if the connection to the tank or reservoir 4 is closed (for example due to cleaning). To avoid the pressure being too high or too low, variable constraints are set on the flow. This is accomplished by the controller configuration shown in this FIG. 12. In this configuration, the controller 11 decreases the upper limit of the flow if the pressure is higher than the maximum pressure, and the controller 11' increases the lower limit of the flow if the pressure is lower than the minimum pressure requirement. The middle controller 11" is the level proportional controller described with respect to FIG. 11.

Figure 13:
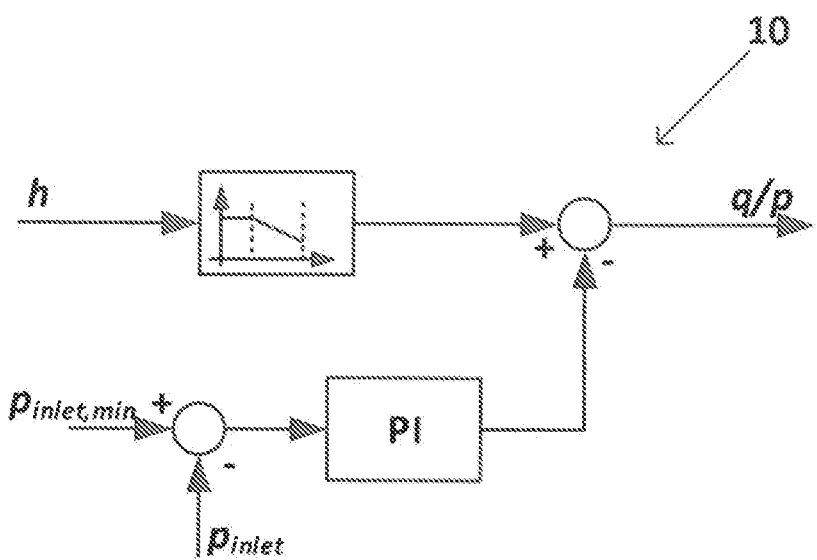
FIG. 13 is a diagram view of a further control structure comprising an inlet pressure protection.

FIG. 13 shows a further control structure 10 comprising an inlet pressure protection, which control structure 10 is available for both pressure control mode and flow control mode. In the following, flow protection in case of flow control mode is described.

In the case where the pressure p is chosen as the control variable (control procedure represented by equation (1), there is a risk that the flow becomes too high or too low for the water supply system 1. In order to avoid the flow being too high or too low, variable constraints are set on the pressure. This is accomplished in a similar way as it was described with respect to FIG. 12 as to pressure protection. Especially, high flow protection is an important feature as this can be part of a protection scheme that protects the water resource from which the pump station or water reservoir supply pump arrangement 2 is supplied.

With respect to inlet pressure protection, the following is noted. In many water supply systems, it is very important to protect the water reservoir at the inlet side of the pump station or water reservoir supply pump arrangement 2. Often the inlet pressure indicates the amount of water available in this reservoir 4. Therefore, an inlet pressure protection is designed for the pump controller 11. This protection has the same form as the protection function described above, except that it uses the inlet pressure measurement for the control, and its control architecture is shown in this figure.

Figure 14:
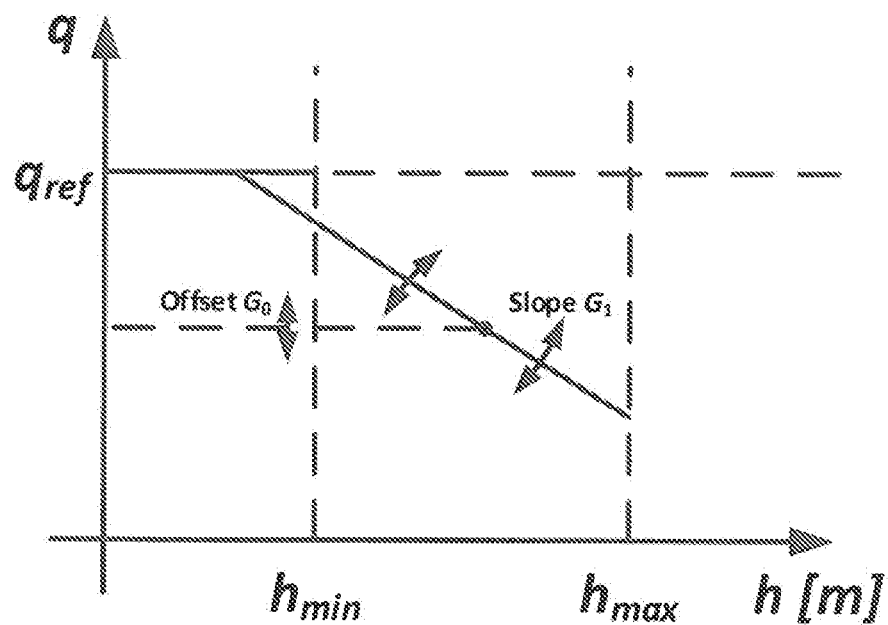
FIG. 14 is a proportional level curve, where a predefined water level band is utilized.

FIG. 14 is a diagram showing a proportional level curve in which both the offset and the gain terms are adjusted. If the largest possible variations in the level and thereby the largest possible exchange of water during the day should be ensured, both the gain $G_1$ and the offset term $q_{max} = G_0$ must be adjusted, wherein the adjustment of both the gain and the offset is illustrated in FIG. 14. With respect to the flow control case, the expression proportional level curve is given by equation (7):

$$q_{set} = G_0 - G_1(h - h_{ref}) \qquad \text{equation (7)}$$

where $$h_{ref} = \frac{h_{max} + h_{min}}{2}$$

Figure 15:
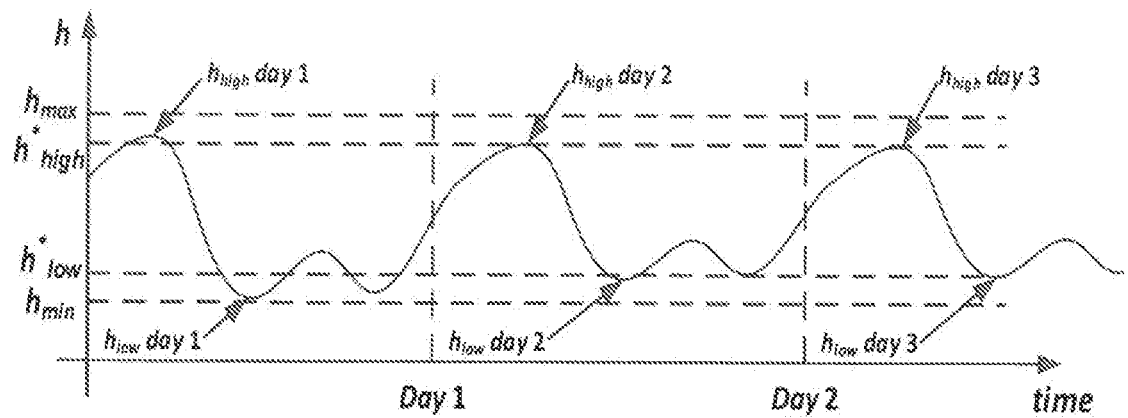
FIG. 15 is diagram showing a further level series identifying the maximum and minimum levels on a daily basis.

In this case, both a value for the gain $G_1$ and a value for the offset $G_0$ have to be identified automatically. The same approach as before is used. That is, as can be seen in FIG. 15, the maximum value of the level obtained during a predefined time frame T, typically a day, is used. The only difference is that both the maximum and minimum levels during the time frame T are used. These values are obtained by equations (8) and (9):

$$h_{high} = \max_{t \in T} h(t) \qquad \text{equation (8)}$$

$$h_{low} = \min_{t \in T} h(t) \qquad \text{equation (9)}$$

References for the maximum and minimum levels can be defined by equations (10) and (11):

$$h_{high}^* = \alpha h_{max} + (1-\alpha) h_{min} \qquad \text{equation (10)}$$

$$h_{low}^* = (1-\beta) h_{max} + \beta h_{min} \qquad \text{equation (11)}$$

where $\alpha$ and $\beta$ are numbers between 0 and 1 which define the distance between the maximum acceptable level and the maximum level to be controlled, and similar for the minimum level. As can be seen in FIG. 15 which shows a level series identifying the maximum and minimum level for every day, the difference between the real maximum and minimum levels and the reference levels decreases each day by adjusting the gain and offset factors $G_1$ and $G_0$.

The update laws for the gain and offset terms are represented by the following equations (12) and (13):

$$G_{1,k+1}=G_{1,k}-K_1((h_{high}*-h_{high})-(h_{low}*-h_{low})) \quad \text{equation (12)}$$

$$G_{0,k+1}=G_{0,k}+K_0((h_{high}*-h_{high})+(h_{low}*-h_{low})) \quad \text{equation (13)}$$

To obtain a better convergence behaviour, it may be beneficial to scale the update law for the offset term by the estimated gain according to equation (14):

$$G_{0,k+1}=G_{0,k}+K_0G_{1,k+1}((h_{high}*-h_{high})+(h_{low}*-h_{low})) \quad \text{equation (14)}$$

As in the previous case, the algorithm can be used for both pressure and flow controlled pump stations or water reservoir supply pump arrangements 2. In the case of a pressure controlled pumping station, the proportional level control can be defined by equation (15):

$$p_{set}=G_0-G_1(h-h_{min}) \quad \text{equation (15)}$$

with update laws for $G_0$ and $G_1$ that are similar in their structure and in the flow controlled pump station or water reservoir supply pump arrangement 2, just with other numerical values for the gain terms.

Figure 16:
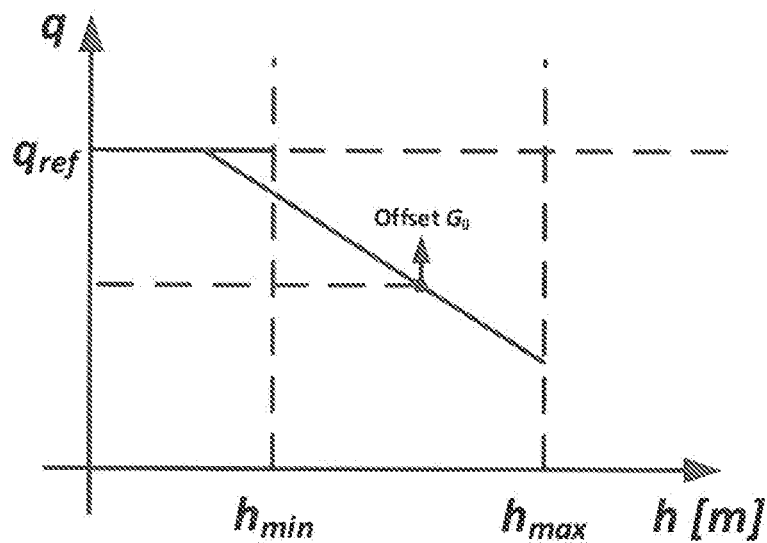
FIG. 16 is a diagram showing the control behaviour exemplified on the flow proportional curve.

FIG. 16 is a diagram showing the control behaviour exemplified on the flow proportional curve for explaining safety control on the level. With the approach where both $G_0$ and $G_1$ are adjusted to fulfil requirements on both the average level and the variation of the level in the reservoir 4, it is no longer possible to guarantee that the output pressure or flow is at its maximum when the minimum level is reached. This can cause the level to decrease below the acceptable minimum level in case of changes in the demand. To solve this problem the flow/pressure set point is increased with the level by adjusting the offset term $G_0$. This is done each time a predetermined time period T has elapsed in accordance with the following update law represented by equation (16):

$$G_{0,t+1} = \begin{cases} G_{0,t}, & h \geq h_{min} \\ G_{0,t} + K_2(h_{min} - h), & h < h_{min} \end{cases} \quad \text{equation (16)}$$

where t denotes the $t^{th}$ time period T the sampling time typically lies in the range of seconds This implies that each time the level becomes lower than the minimum level $h_{min}$, the following algorithm according to equation (17) is running $$G_{0,k+1}=G_{0,k}+K_2(h_{min}-h), h<h_{min} \quad \text{equation (17)}$$

where $\kappa_2$ is an update gain. This behaviour is illustrated in FIG. 16 for a case of levels below the minimum level.

Figure 17:
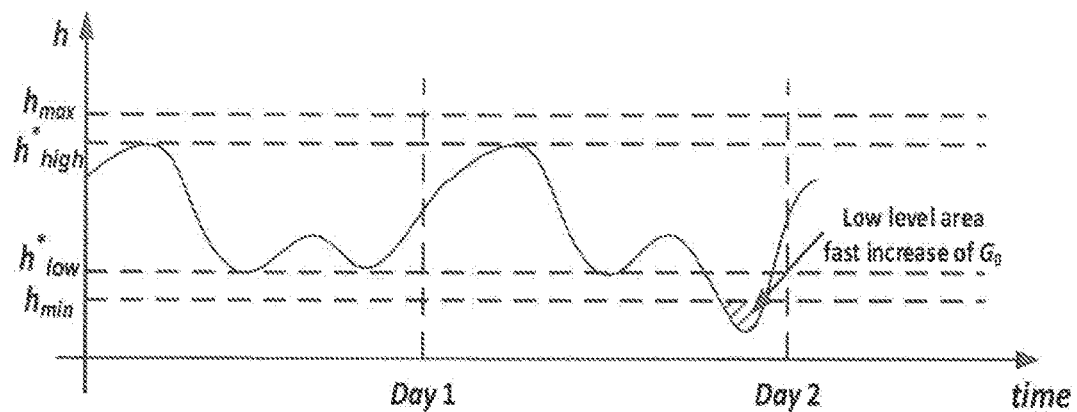
FIG. 17 is a diagram showing the level behaviour over a period of a couple of days, where the actual water level has fallen below the minimum permissible water level threshold.

FIG. 17 is a diagram showing the level behaviour over a period of a couple of days, with an active control as described above in connection with FIG. 16. At day 2 the water level becomes lower than the minimum level $h_{min}$, equation (17) becomes active and $G_0$ is updated.

Figure 18:
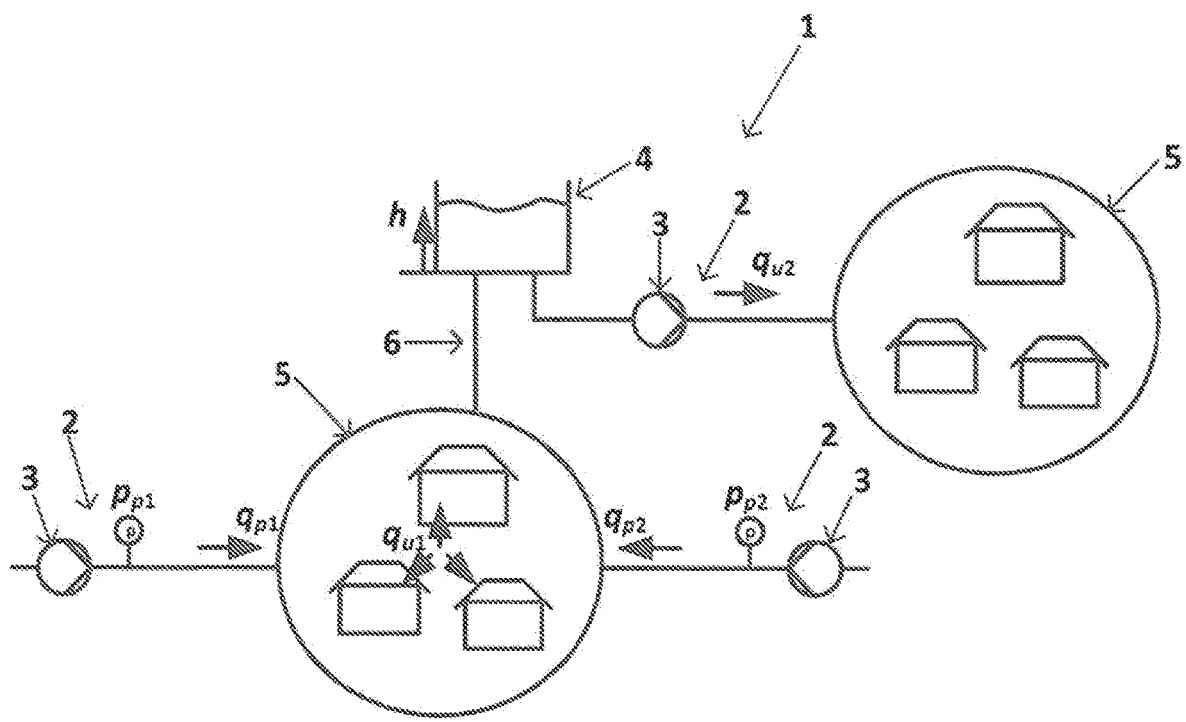
FIG. 18 is a schematic illustration of a system with elevated reservoir according to an embodiment of the present invention.

FIG. 18 is a schematic illustration of a system with elevated reservoir according to an embodiment of the present invention with a filling from multiple pump stations or water reservoir supply pump arrangements 2. In the case where the reservoir 4 is supplied from multiple sources, the control of the individual pump station or water reservoir supply pump arrangement 2 should share the load (the flow) between the units in accordance with predefined settings. A water supply system 1 where two pump stations or water reservoir supply pump arrangements 2 supply water to the reservoir 4 is shown in this figure. Here, each of the pumps 3 runs the same control loop represented by equation (18):

$$q_{set,i}=s_iG_0-s_iG_1(h-h_{min}) \quad \text{equation (18)}$$

Here, s is a scaling coefficient that adjusts the amount of water delivered by the different pumping stations or water reservoir supply pump arrangements 2. That is, if $s_i=s_j$ then the $i^{th}$ and $j^{th}$ pump station or water reservoir supply pump arrangement 2 delivers the same flow, and if $s_i \neq s_j$, then the $i^{th}$ and $j^{th}$ pump station or water reservoir supply pump arrangement 2 delivers flow accordingly. In this embodiment, $s_i$ i=1, . . . , n is chosen by the users.

The update laws for $G_0$ and $G_1$ are the same for all the pump stations or water reservoir supply pump arrangements 2 and a consensus algorithm ensures that the individual pump stations match the values. The consensus updates are performed with a higher sampling rate than the update law described by equations (12) and (13). The sampling time of the update law is typically 24 hours and for the consensus algorithm below 1 hour. The consensus updates are controlled by the following update law described by equations (19) and (20):

$$G_{0,k+1}^{(j)} = G_{0,k}^{(j)} + \frac{\kappa}{|U|}\sum_{i \in U}\left(G_{0,k}^{(i)} - G_{0,k}^{(j)}\right) \quad \text{equation (19)}$$

$$G_{1,k+1}^{(j)} = G_{1,k}^{(j)} + \frac{\kappa}{|U|}\sum_{i \in U}\left(G_{1,k}^{(i)} - G_{1,k}^{(j)}\right) \quad \text{equation (20)}$$

where k denotes the $k^{th}$ sampling time. The sampling time typically lies in the range of 10-60 minutes.

where U is the set of active units (the units that have communicated their values of $G_0$ and $G_1$ to the $j^{th}$ unit), |U| is the number of units that have communicated their values, and $\kappa$ is a gain factor that controls the convergence of the agreement between the units.

Figure 19:
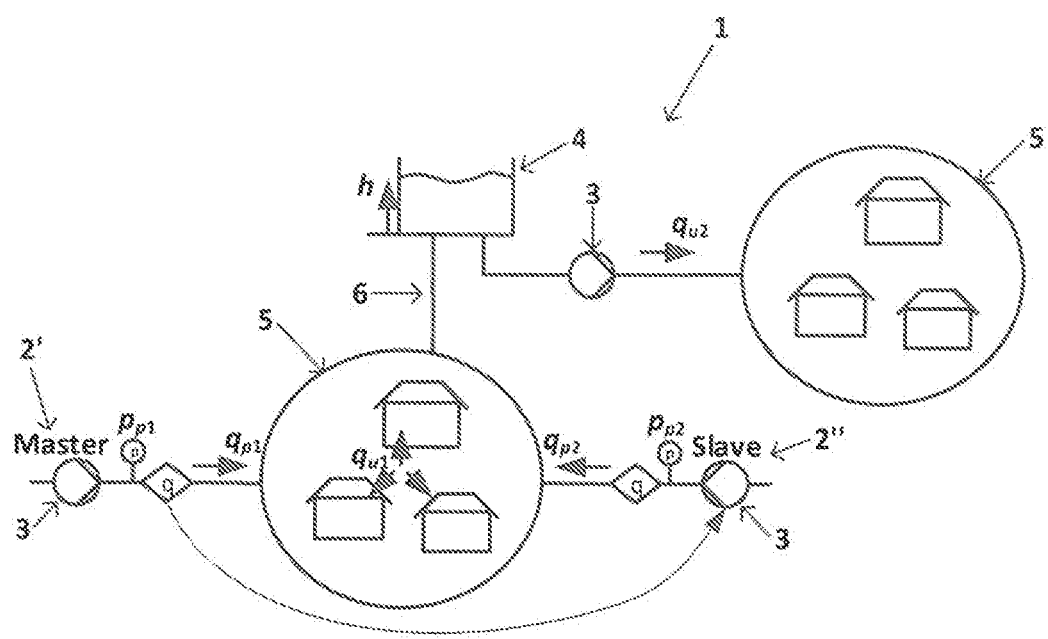
FIG. 19 is a schematic illustration of a water supply system according to an embodiment of the present invention.

FIG. 19 is a schematic illustration of a further water supply system 1 according to an embodiment of the present invention wherein filling is carried out by multiple pump stations or water reservoir supply pump arrangements 2. In the case shown here, more than one pump station or water reservoir supply pump arrangements 2 share the flow between them in accordance with user defined rules. This is done by defining one of the pump stations or water reservoir supply pump arrangements 2 as the master station 2', and then letting this master pump station 2' communicate flow references to the remaining slave pump station 2" in accordance with the predefined rule as can be seen from this figure.

Thereby, the slave pump station 2" is controlled to a reference flow which is calculated based on the flow of the master pump station 2' according to equation (21):

$$q_{set,i}=s_iq_{set,1} \quad \text{equation (21)}$$

where $q_{set,i}$ is the flow reference for the $i_{th}$ slave pump controller, $q_{set,1}$ is the flow of the master pump controller, and $s_i$ is a number that defined the distribution of the flow between the pump stations 2', 2".

Finally, some alternative applications are mentioned. The proposed control approach can also be used for filling large reservoirs such as big ponds for raw water for water supply. Also, emptying reservoirs can be accomplished by a control that controls the flow proportional to the level. In this case, the flow should be controlled in accordance to the level following the rule represented by equation (22):

$$q_{set}=q_{max}-G(h_{max}-h) \quad \text{equation (22)}$$

Besides this, the approach is similar to the embodiments described above.

While specific embodiments of the invention have been shown and described in detail to illustrate the application of the principles of the invention, it will be understood that the invention may be embodied otherwise without departing from such principles.

What is claimed is:

1. A method of controlling a water reservoir supply pump arrangement, the method comprising the steps of:
   determining a set value of the pump arrangement based on an offset value reduced by a component which is a function of a difference between an actual water level and a predetermined water level in a water reservoir;
   weighting the difference by an automatically adjusted proportional gain factor; and
   adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the gain factor (G) is adjusted each time after the predetermined time interval has elapsed such that $$G_{k+1}=G_k-K(h_{high}*-h_{high})$$

where $$h_{high}*=\alpha h_{max}+(1-\alpha)h_{min}$$

and where k denotes the $k^{th}$ time interval T, $\alpha$ denotes the fraction, $h_{max}$ denotes a maximum permissible level threshold, $h_{min}$ denotes a minimum permissible level threshold, $h_{high}$ is the maximum measured level over a given period of time, and K being a predetermined constant>0.

2. The method according to claim 1, wherein the set value and the offset value are one of pump reference pressure, reference pump flow, reference pump speed, reference number of switched-on pumps in the water reservoir supply pump arrangement.

3. The method according to claim 1, wherein the predetermined water level is a minimum water level, the actual water level is controlled via a proportional controller.

4. The method according to claim 1, wherein the water level, when the gain factor is adjusted, is the maximum water level in the reservoir.

5. The method according to claim 1, wherein the water reservoir supply pump arrangement is switched on when the actual water level is below a predetermined minimum level and is switched off when the actual water level has reached a predetermined maximum water level.

6. The method according to claim 1, wherein the set value is flow, and a maximum set flow is decreased by a predetermined flow value if the pressure is higher than a predetermined maximum pressure value, and a minimum set flow is increased by a predetermined flow value as long as the pressure is lower than a predetermined minimum pressure value.

7. The method according to claim 1, wherein the set value is pressure, and a maximum set pressure is decreased by a predetermined pressure value if the flow is higher than a predetermined maximum flow value, and a minimum set pressure is increased by a predetermined pressure value if the flow is lower than a predetermined minimum flow value.

8. The method according to claim 1, wherein the gain and the offset value are adjusted such that variations of the water level over the time utilize a predefined water level band, where the water level band lies between a maximum and a minimum permissible water level.

9. The method according to claim 1, wherein the set value is one of pressure and flow, and the offset value is gain, and wherein the proportional gain factor and the offset value are adjusted each time the predetermined interval has lapsed, the proportional gain factor and the offset value being adjusted as $$G_{1,k+1}=G_{1,k}-K_1((h_{high}*-h_{high})-(h_{low}*-h_{low}))$$

$$G_{0,k+1}=G_{0,k}+K_0((h_{high}*-h_{high})+(h_{low}*-h_{low}))$$

with
$G_{1, k+1}$ being the set value adjusted after the $(k+1)^{th}$ time interval,
$G_{1, k}$ being the set value adjusted after the $k^{th}$ time interval,
$G_{0, k+1}$ being the offset value adjusted after the $(k+1)^{th}$ time interval,
$G_{0, k}$ being the offset value adjusted after the $k^{th}$ time interval,
and
$h_{high}$ being the maximum level of the $k^{th}$ time interval,
$h_{low}$ being the minimum level of the $k^{th}$ time interval,
and $$h_{high}*=\alpha h_{max}+(1-\alpha)h_{min}$$

$$h_{low}*=(1-\beta)h_{max}+\beta h_{min}$$

where k denotes the $k^{th}$ said time period and $\alpha$ denotes the fraction, $\beta$ denotes another fraction, $h_{max}$ denotes a maximum permissible level threshold, $h_{min}$ denotes a minimum permissible level threshold, $h_{high}$ is the maximum level over a given period of time, $h_{low}$ is the minimum level over a given period of time and $K_0$ and $K_1$ being predetermined constants>0.

10. The method according to claim 1, wherein the set value is one of pressure and flow, and the offset value is gain, and wherein the proportional gain factor and the offset value are adjusted each time a predetermined interval has elapsed, the proportional gain factor and the offset value being adjusted as $$G_{1,k+1}=G_{1,k}-K_1((h_{high}*-h_{high})-(h_{low}*-h_{low}))$$

$$G_{0,k+1}=G_{0,k}+K_0G_{1,k+1}((h_{high}*-h_{high})+(h_{low}*-h_{low}))$$

with
$G_{1, k+1}$ being the set value adjusted after the $(k+1)^{th}$ time interval,
$G_{1, k}$ being the set value adjusted after the $k^{th}$ time interval,
$G_{0, k+1}$ being the offset value adjusted after the $(k+1)^{th}$ time interval,
$G_{0, k}$ being the offset value adjusted after the $k^{th}$ time interval,
and
$h_{high}$ being the maximum level of the $k^{th}$ time interval,
$h_{low}$ being the minimum level of the $k^{th}$ time interval,
and $$h_{high}*=\alpha h_{max}+(1-\alpha)h_{min}$$

$$h_{low}*=(1-\beta)h_{max}+\beta h_{min}$$

where k denotes the $k^{th}$ said time period, $\alpha$ denotes the fraction, $\beta$ denotes another fraction, $h_{max}$ denotes a maximum level threshold, $h_{min}$ denotes a minimum level threshold, $h_{high}$ is the maximum level over a given period of time, $h_{low}$ is the minimum level over a given period of time and $K_0$ and $K_1$ being predetermined constants>0.

11. The method according to claim 1, wherein the set value is one of pressure and flow, and the offset value is gain, and wherein the offset value is updated each time the predetermined interval has elapsed and if the water level has dropped below the minimum permissible level ($h_{min}$), the offset value being adjusted as $$G_{0,t+1} = \begin{cases} G_{0,t}, & h \geq h_{min} \\ G_{0,t} + K_2(h_{min} - h), & h < h_{min} \end{cases}$$

with $G_{0, t+1}$ being the offset value adjusted after the $(t+1)^{th}$ time interval,
$G_{0, t}$ being the offset value adjusted after the $t^{th}$ time interval, and
$K_2$ being a predetermined constant >0.

12. A method of controlling a plurality of water reservoir supply pump arrangements, the method comprising the steps of:
supplying a same water reservoir with all pump arrangements;
providing flow as a set value;
determining each set value of each pump arrangement based on an offset value reduced by a component which is a function of a difference between an actual water level and a predetermined water level in said same water reservoir, and the respective set values being scaled according to the following formula:

$$q_{set,i} = s_i G_0 - s_i G_1(h - h_{min})$$

with $s_i$ denoting a scaling coefficient adjusting the amount of water delivered by the $i^{th}$ pump arrangement, and i denoting the respective pump arrangement, wherein a gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the proportional gain factor and the offset value are the same for all pump arrangements, and given by:

$$G_{0,t+1}^{(j)} = G_{0,t}^{(j)} + \frac{\kappa}{|U|} \sum_{i \in U} \left( G_{0,t}^{(i)} - G_{0,t}^{(j)} \right)$$

$$G_{1,t+1}^{(j)} = G_{1,t}^{(j)} + \frac{\kappa}{|U|} \sum_{i \in U} \left( G_{1,t}^{(i)} - G_{1,t}^{(j)} \right)$$

with U being the number of switched on pumps, and $\kappa$ being a predetermined gain convergence control factor.

13. The method according to claim 12, wherein one of the pump arrangements comprise a plurality of slave pump arrangements and respective sub-pump flows are calculated according to $$q_{set,i} = s_i q_{set,1}$$

with $q_{set, i}$ being the flow reference for the $i^{th}$ slave pump controller, $q_{set, 1}$ being the flow of a master controller, and $s_i$ being a number that defines the distribution of the flow between the pump arrangements, in particular, between pump stations.

14. A water reservoir supply pump arrangement comprising:
at least one water pump; and
a control device configured to control the at least one pump by:
determining a set value of the pump arrangement based on an offset value reduced by a component which is a function of a difference between an actual water level and a predetermined water level in a water reservoir;
weighting the difference by an automatically adjusted proportional gain factor; and
adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that a maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the gain factor or the offset value or both the gain factor and the offset value are adjusted such that the maximum water level measured over time is a fraction of a difference between a maximum and a minimum permissible water level, wherein the gain factor (G) is adjusted each time after the predetermined time interval has elapsed such that $$G_{k+1} = G_k - K(h_{high}^* - h_{high})$$

where $$h_{high}^* = \alpha h_{max} + (1-\alpha) h_{min}$$

and where k denotes the $k_{th}$ said time interval, $\alpha$ denotes the fraction, $h_{max}$ denotes a maximum permissible level threshold, $h_{min}$ denotes a minimum permissible level threshold, $h_{high}$ is the maximum measured level over a given period of time, and K being a predetermined constant>0.

15. The water reservoir supply pump arrangement according to claim 14, wherein the water level, when the gain factor is adjusted, is the maximum water level in the reservoir.

16. The method according to claim 14, wherein the set value is one of pressure and flow, and the offset value is gain, and wherein the offset value is updated each time the predetermined interval has elapsed and if the water level has dropped below the minimum permissible level ($h_{min}$), the offset value being adjusted as $$G_{0,t+1} = \begin{cases} G_{0,t}, & h \geq h_{min} \\ G_{0,t} + K_2(h_{min} - h), & h < h_{min} \end{cases}$$

with $G_{0, t+1}$ being the offset value adjusted after the $(t+1)^{th}$ time interval,
$G_{0, t}$ being the offset value adjusted after the $t^{th}$ time interval, and
$K_2$ being a predetermined constant >0.

17. The method according to claim 14, further comprising cleaning the water reservoir by one of emptying the water in the water reservoir and filling the water reservoir with water to a maximum level of the reservoir to flush the water reservoir.

18. A method of controlling a water reservoir supply pump arrangement, the method comprising the steps of:
determining a set value of the pump arrangement based on an offset value reduced by a component which is a function of a difference between an actual water level and a predetermined water level in a water reservoir;
weighting the difference by an automatically adjusted proportional gain factor; and
adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the set value is one of pressure and flow, and the offset value is gain, and wherein the proportional gain factor and the offset value are adjusted each time the predetermined interval has lapsed, the proportional gain factor and the offset value being adjusted as $$G_{1,k+1}=G_{1,k}-K_1((h_{high}*-h_{high})-(h_{low}*-h_{low}))$$

$$G_{0,k+1}=G_{0,k}+K_0((h_{high}*-h_{high})+(h_{low}*-h_{low}))$$

with
$G_{1,\ k+1}$ being the set value adjusted after the $(k+1)^{th}$ time interval,
$G_{1,\ k}$ being the set value adjusted after the $k^{th}$ time interval,
$G_{0,\ k+1}$ being the offset value adjusted after the $(k+1)^{th}$ time interval,
$G_{0,\ k}$ being the offset value adjusted after the $k^{th}$ time interval,
and
$h_{high}$ being the maximum level of the $k^{th}$ time interval,
$h_{low}$ being the minimum level of the $k^{th}$ time interval,
and $$h_{high}*=\alpha h_{max}+(1-\alpha)h_{min}$$

$$h_{low}*=(1-\beta)h_{max}+\beta h_{min}$$

where k denotes the $k^{th}$ said time period and α denotes the fraction, β denotes another fraction, $h_{max}$ denotes a maximum permissible level threshold, $h_{min}$ denotes a minimum permissible level threshold, $h_{high}$ is the maximum level over a given period of time, $h_{low}$ is the minimum level over a given period of time and $K_0$ and $K_1$ being predetermined constants>0.

19. A method of controlling a water reservoir supply pump arrangement, the method comprising the steps of:
determining a set value of the pump arrangement based on an offset value reduced by a component which is a function of a difference between an actual water level and a predetermined water level in a water reservoir;
weighting the difference by an automatically adjusted proportional gain factor; and
adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the set value is one of pressure and flow, and the offset value is gain, and wherein the proportional gain factor and the offset value are adjusted each time a predetermined interval has elapsed, the proportional gain factor and the offset value being adjusted as $$G_{1,k+1}=G_{1,k}-K_1((h_{high}*-h_{high})-(h_{low}*-h_{low}))$$

$$G_{0,k+1}=G_{0,k}+K_0G_{1,k+1}((h_{high}*-h_{high})+(h_{low}*-h_{low}))$$

with
$G_{1,\ k+1}$ being the set value adjusted after the $(k+1)^{th}$ time interval,
$G_{1,\ k}$ being the set value adjusted after the $k^{th}$ time interval,
$G_{0,\ k+1}$ being the offset value adjusted after the $(k+1)^{th}$ time interval,
$G_{0,\ k}$ being the offset value adjusted after the $k^{th}$ time interval,
and
$h_{high}$ being the maximum level of the $k^{th}$ time interval,
$h_{low}$ being the minimum level of the $k^{th}$ time interval,
and $$h_{high}*=\alpha h_{max}+(1-\alpha)h_{min}$$

$$h_{low}*=(1-\beta)h_{max}+\beta h_{min}$$

where k denotes the $k^{th}$ said time period, α denotes the fraction, β denotes another fraction, $h_{max}$ denotes a maximum level threshold, $h_{min}$ denotes a minimum level threshold, $h_{high}$ is the maximum level over a given period of time, $h_{low}$ is the minimum level over a given period of time and $K_0$ and $K_1$ being predetermined constants>0.

20. A method of controlling a water reservoir supply pump arrangement, the method comprising the steps of:
determining a set value of the pump arrangement based on an offset value reduced by a component which is a function of a difference between an actual water level and a predetermined water level in a water reservoir;
weighting the difference by an automatically adjusted proportional gain factor; and
adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the set value is one of pressure and flow, and the offset value is gain, and wherein the offset value is updated each time the predetermined interval has elapsed and if the water level has dropped below the minimum permissible level ($h_{min}$), the offset value being adjusted as $$G_{0,t+1} = \begin{cases} G_{0,t}, & h \geq h_{min} \\ G_{0,t} + K_2(h_{min} - h), & h < h_{min} \end{cases}$$

with $G_{0, t+1}$ being the offset value adjusted after the $(t+1)^{th}$ time interval, $G_{0, t}$ being the offset value adjusted after the $t^{th}$ time interval, and $K_2$ being a predetermined constant >0.

21. A method of controlling a plurality of water reservoir supply pump arrangements, the method comprising the steps of:
supplying a same water reservoir with all pump arrangements;
providing flow as a set value;
determining each set value of each pump arrangement based on an offset value reduced by a component which is a function of a difference between an actual water level and a predetermined water level in said same water reservoir, and the respective set values being scaled according to the following formula:

$$q_{set,i} = s_i G_0 - s_i G_1(h - h_{min})$$

with $s_i$ denoting a scaling coefficient adjusting the amount of water delivered by the $i^{th}$ pump arrangement, and i denoting the respective pump arrangement, wherein a gain factor or the offset value or both the gain factor and the offset value are adjusted such that the maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein one of the pump arrangements comprise a plurality of slave pump arrangements and respective sub-pump flows are calculated according to $$q_{set,i} = s_i q_{set,1}$$

with $q_{set, i}$ being the flow reference for the $i^{th}$ slave pump controller, a $q_{set, 1}$ being the flow of a master controller, and $s_i$ being a number that defines the distribution of the flow between the pump arrangements, in particular, between pump stations.

22. A water reservoir supply pump arrangement comprising:
at least one water pump; and
a control device configured to control the at least one pump by:
determining a set value of the pump arrangement based on an offset value reduced by a component which is a function of a difference between an actual water level and a predetermined water level in a water reservoir;
weighting the difference by an automatically adjusted proportional gain factor; and
adjusting the gain factor each time a predetermined water level in the reservoir is reached or a predetermined time interval has elapsed or both each time a predetermined water level in the reservoir is reached and a predetermined time interval has elapsed, wherein the gain factor or the offset value or both the gain factor and the offset value are adjusted such that a maximum water level measured over time is a fraction of a difference between a maximum and a minimum permissible water level, wherein the actual water level is controlled based on one or more of the gain factor and the offset value such that the actual water level varies in the water reservoir and water is exchanged in the water reservoir to maintain water quality in the water reservoir, wherein the set value is one of pressure and flow, and the offset value is gain, and wherein the offset value is updated each time the predetermined interval has elapsed and if the water level has dropped below the minimum permissible level ($h_{min}$), the offset value being adjusted as $$G_{0,t+1} = \begin{cases} G_{0,t}, & h \geq h_{min} \\ G_{0,t} + K_2(h_{min} - h), & h < h_{min} \end{cases}$$

with $G_{0, t+1}$ being the offset value adjusted after the $(t+1)^{th}$ time interval, $G_{0, t}$ being the offset value adjusted after the $t^{th}$ time interval, and $K_2$ being a predetermined constant >0.

* * * * *